United States Patent [19]

Cushman

[11] Patent Number: 5,410,944
[45] Date of Patent: May 2, 1995

[54] TELESCOPING ROBOT ARM WITH SPHERICAL JOINTS

[76] Inventor: William B. Cushman, 1315 Finley Dr., Pensacola, Fla. 32514

[21] Appl. No.: 70,774

[22] Filed: Jun. 3, 1993

[51] Int. Cl.$^6$ .................... F15B 11/00; F01C 9/00; G05G 11/00
[52] U.S. Cl. ........................... 91/520; 91/530; 92/2; 92/67; 92/122; 92/124; 74/490.06; 74/490.05; 901/29
[58] Field of Search ............ 92/2, 51, 52, 53, 61, 92/120, 122, 121, 118, 163, 164, 165 PR, 124, 67; 91/167 R, 167 A, 173, 178, 534, 535, 520, 530; 901/22, 28, 29, 37; 74/479 BJ, 479 BW

[56] References Cited

U.S. PATENT DOCUMENTS

| | | | |
|---|---|---|---|
| 2,756,563 | 7/1956 | Bohlman | 92/163 X |
| 2,899,938 | 8/1959 | Gardner | 92/164 X |
| 3,279,755 | 10/1966 | Notenboom et al. | 92/53 X |
| 3,620,131 | 11/1971 | Nitkiewicz et al. | 92/2 |
| 3,818,800 | 6/1974 | Bertaux | 92/163 X |
| 3,973,469 | 8/1976 | Humen | |
| 4,045,958 | 9/1977 | Wells | 92/122 X |
| 4,186,911 | 2/1980 | Huet et al. | 92/2 X |
| 4,194,437 | 5/1980 | Rosheim | 92/120 |
| 4,296,681 | 10/1981 | Rosheim | 92/122 |
| 4,312,622 | 1/1982 | Favareto | 901/22 X |
| 4,430,923 | 2/1984 | Inaba et al. | 91/530 X |
| 4,459,898 | 7/1984 | Harjar et al. | 92/61 |
| 4,540,343 | 9/1985 | Perkins | 92/120 X |
| 4,628,765 | 12/1986 | Dien et al. | |
| 4,751,868 | 6/1988 | Paynter | 91/520 X |
| 5,016,489 | 5/1991 | Yoda | 901/22 X |
| 5,178,032 | 1/1993 | Zona et al. | 901/29 X |
| 5,255,571 | 10/1993 | Smith | 901/29 X |
| 5,322,004 | 6/1994 | Sims | 92/52 |

OTHER PUBLICATIONS

Roth, R. C. "Elastic Wave Motor Produces Linear Motion with Precise, High Force" *Power Conversion & Intelligent Motion* pp. 16–21, Aug. 1992.

*Primary Examiner*—John E. Ryznic

[57] ABSTRACT

A telescoping robot arm with singularity-free three degrees of motion freedom spherical joints is disclosed. The telescoping section and spherical joints are hydraulically operated to achieve a high power-to-weight ratio and use conventional seals of the type normally used on hydraulic pistons. The spherical joints of the instant invention are comprised of a generally spherical cavity containing a tiltable member with integral a retractable arcuate vanes interdigitized with retractable arcuate vanes in a non-tiltable member. A plurality of cavities is formed within the spaces between the interdigitized arcuate vanes of the instant invention, with the volume of these intervane cavities being controlled with an equal plurality of hydraulic valves. A plurality of spherical joints of the present invention may be interconnected with double acting telescoping sections of the present invention to form a robotic arm assembly. The telescoping sections are double acting and contain splines or similar structures to prevent rotation while allowing controllable extension and retraction. A combination of two spherical joints and one telescoping section of the instant invention make a singularity free robot arm with seven degrees of motion freedom.

9 Claims, 7 Drawing Sheets

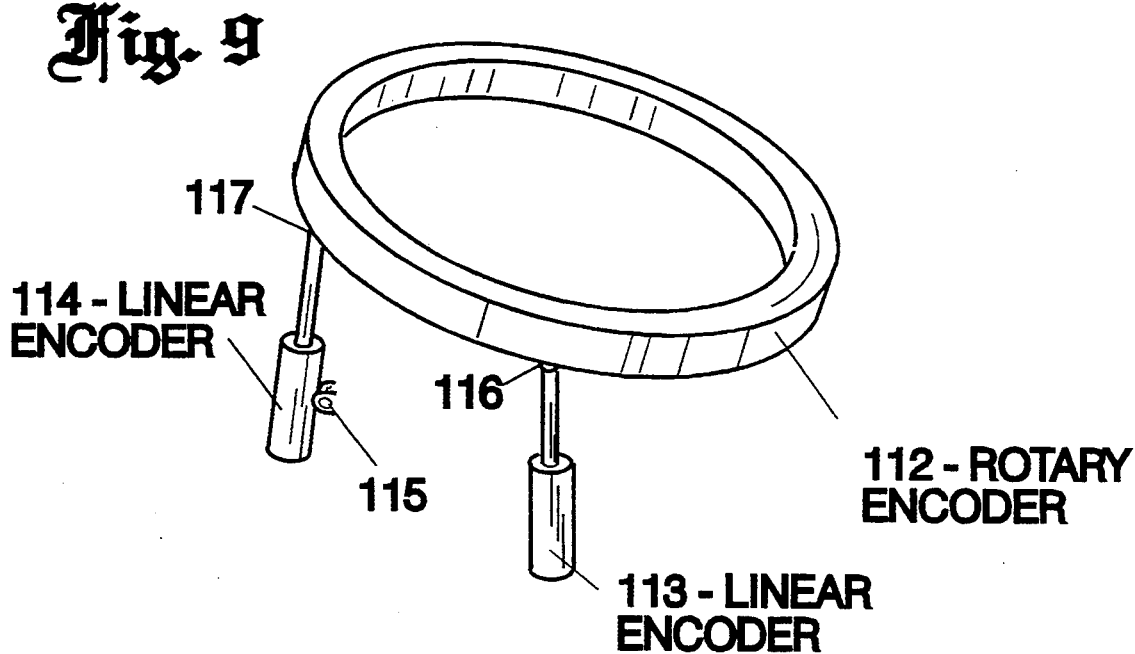
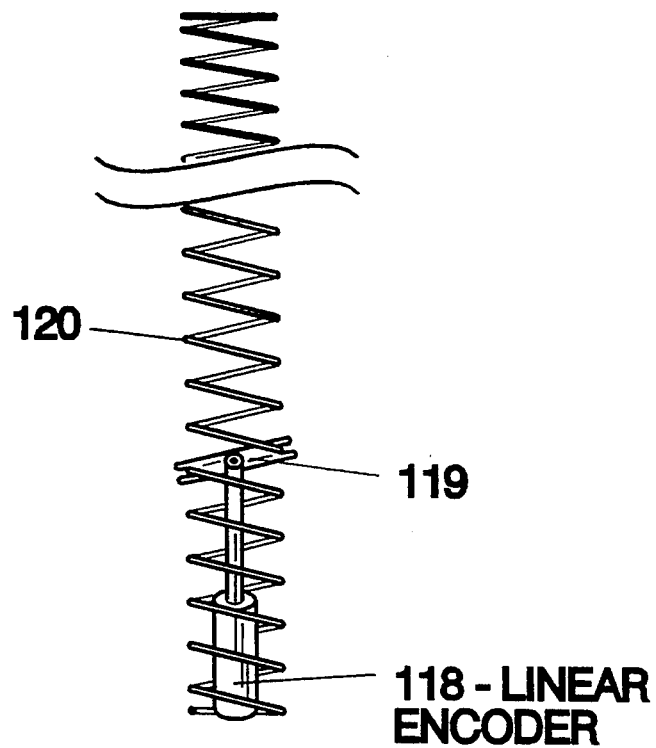

TELESCOPING ROBOT ARM WITH SPHERICAL JOINTS

BACKGROUND OF THE INVENTION

1. Field of the Invention

The present invention relates generally to the field of robotics, and more particularly to hydraulically operated robot arms with spherical wrist joints and telescoping extension means.

2. Description of Related Art

Robotic arm mechanisms may be divided broadly into two major categories: 1), those that are operated with hydraulic actuators and 2), those that use other means, usually electric motors and various gearing or linkages or both. There are advantages and disadvantages to both approaches. Hydraulic solutions are very powerful in limited spaces but require seals to retain working fluids. Electric motor driven mechanisms usually don't have leakage problems but are relatively weak for a given size effector. Depending on the exact configuration, both hydraulic and electric approaches can suffer from significant singularity problems.

Singularities occur when the mechanism gets "twisted" and must make a high velocity movement of a particular joint mechanism to compensate for the twist and allow the end effector to follow a particular path and velocity. This problem was studied by Robert Y. Dien and Ethan C. Luce, and the results are presented in their U.S. Pat. No. 4,628,765 for a spherical robotic wrist joint. They conclude that singularities can be avoided if the various axes of rotation used coincide at a single point. One such configuration is a spherical joint.

The present invention is based on hydraulically actuated spherical joints so the background discussion is limited to similar hydraulically actuated mechanisms.

U.S. Pat. No. 3,973,469, issued to John Humen, shows a generally spherical floating chamber machine that might be back-driven with fluid pressure to effect a two-degree of freedom wrist joint.

U.S. Pat. No. 4,045,958, issued to William M. Wells, shows a generally spherical multi-directional positioner with two degrees of motion freedom that could be used as a robot wrist joint.

U.S. Pat. Nos. 4,194,437 and 4,296,681, issued to Mark E. Rosheim, show generally spherical hydraulic servo mechanisms with two degrees of freedom that could be used as a robot wrist joint.

Each of the above listed patents show devices that appear singularity-free within the range of their motions. However, some appear to be difficult to seal against leaks. All are limited to two degrees of motion freedom, albeit in different axes.

SUMMARY OF THE INVENTION

Accordingly, an object of this invention is to provide an improved hydraulically operated spherical wrist joint with singularity-free three degrees of freedom movement.

Another object of this invention is to provide a hydraulically operated spherical wrist joint with effective and simple sealing means.

Another object of this invention is to provide a double acting hydraulically operated telescoping section for a robot arm assembly that is intentionally limited to one degree of movement freedom and provides a complementary adjunct to the spherical joints of the instant invention in making a robot arm assembly.

Another object of this invention is to provide a hydraulically operated double-acting telescoping section with effective and simple sealing means.

A further object of this invention is to provide a robot arm assembly comprised of a plurality of spherical joints of the present invention interlinked with telescoping sections of the present invention.

These and additional objects of the invention are accomplished with at least one telescoping section and at least one spherical joint of the instant invention. Both are hydraulically operated to achieve a high power-to-weight ratio and use conventional seals of the type normally used on hydraulic pistons. The spherical joints of the instant invention are comprised of a generally spherical cavity containing a tiltable member with integral retractable arcuate vanes interdigitized with retractable arcuate vanes in a non-tiltable member. A plurality of cavities is formed within the spaces between the interdigitized arcuate vanes of the instant invention, with the volume of these intervane cavities being controlled with an equal plurality of hydraulic valves. A plurality of spherical joints of the present invention may be interconnected with double acting telescoping sections of the present invention to form a robotic arm assembly. The telescoping sections are double acting and contain splines or similar structures to prevent rotation while allowing controllable extension and retraction. A combination of two spherical joints and one telescoping section of the instant invention make a singularity free robot arm with seven degrees of motion freedom.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements. The representations in each of the figures is diagrammatic and no attempt is made to indicate actual scales or precise ratios. Proportional relationships are shown as approximations.

FIG. 9 is a view of an exemplary system for position measurement of a spherical joint of the instant invention showing a rotary encoder and two linear encoders.

FIG. 10 is a view of an exemplary system for position measurement of a telescoping section of the instant invention showing a spring used as a proportioning element for a linear encoder with limited stroke.

DESCRIPTION OF THE PREFERRED EMBODIMENTS

Figure 1:
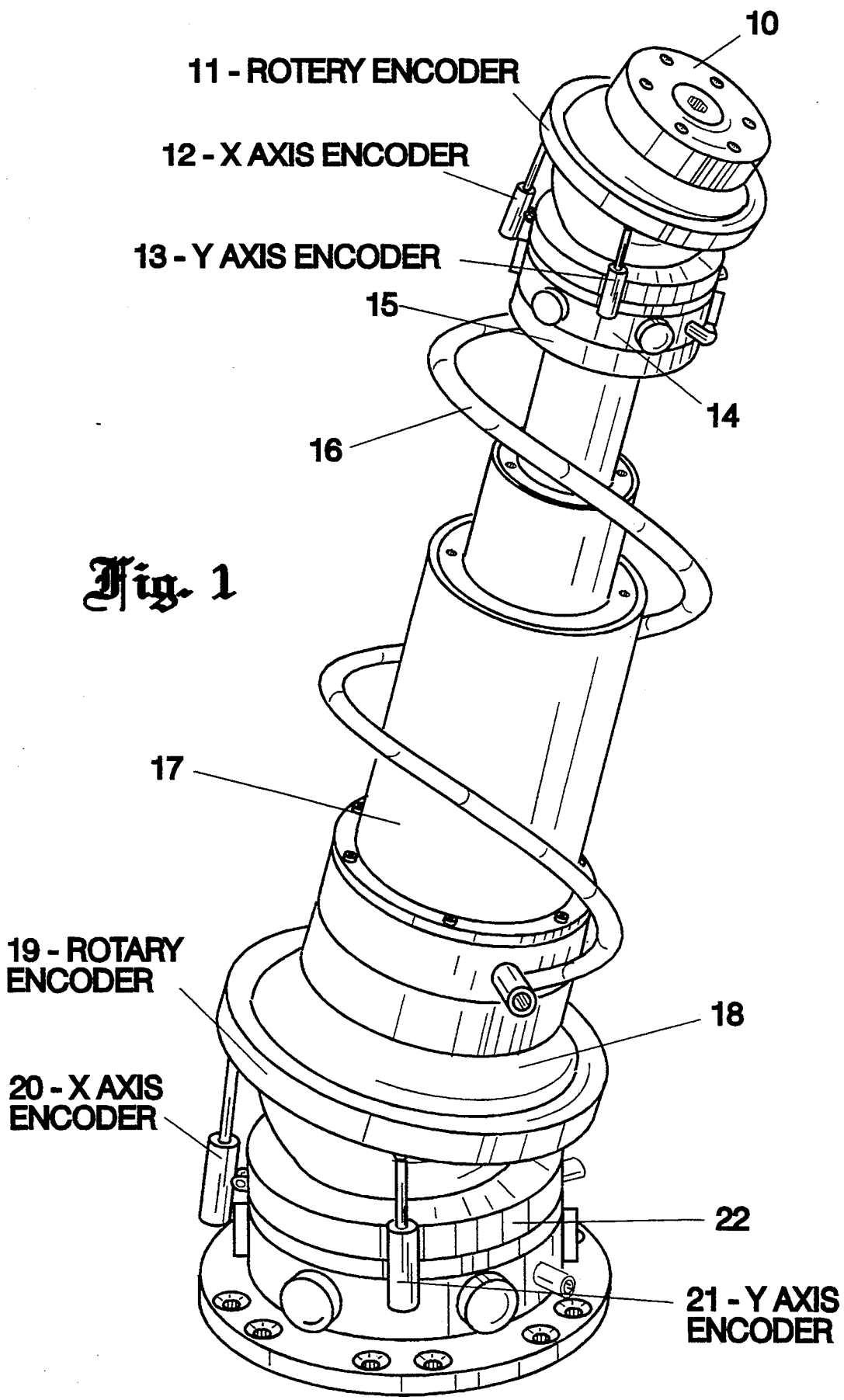
FIG. 1 is a general view of an exemplary embodiment of the essential elements of the instant invention showing two spherical wrist joints and one telescoping member and the relationship of elements relative to one another.

Before proceeding with the Detailed Description, the parts indicated on the drawings by numerals are identified below to aid in the reader's understanding of the present invention.

10. Upper spherical joint moveable platform.
11. Upper spherical joint rotary encoder.
12. Upper spherical joint x axis encoder.
13. Upper spherical joint y axis encoder.
14. Upper spherical joint base assembly
15. Modified base plate.
16. Upper spherical joint umbilical.
17. Telescoping assembly.
18. Lower spherical joint moveable platform.
19. Lower spherical joint rotary encoder.
20. Lower spherical joint x axis encoder.
21. Lower spherical joint y axis encoder.
22. Lower spherical joint base assembly.
23. Central bolt.
24. Seal.
25. Moveable platform.
26. Seal.
27. Spherical casing.
28. Second arcuate vane guide.
29. Second arcuate vane guide.
30. Second arcuate vane guide.
31. Second arcuate vane.
32. Second arcuate vane.
33. Second arcuate vane
34. First arcuate vane.
35. First arcuate vane.
36. First arcuate vane
37. Central sphere.
38. First arcuate vane guide.
39. Seal.
40. Spherical base.
41. Bolts.
42. Valve base.
43. Valve.
44. Valve.
45. Valve.
46. Valve.
47. Valve.
48. Valve.
49. Hydraulic fluid input port.
50. Hydraulic fluid return port.
51. Base plate.
52. Bolts.
53. Primary pressure channel.
54. Primary pressure area.
55. Primary pressure channel.
56. Primary pressure area.
57. Center of spheres.
58. Inner spherical surface.
59. Median spherical surface.
60. Outer spherical surface.
61. Radii.

-continued

62. Section of valve base.
63. Solenoid windings.
64. Magnetostrictive rod.
65. Seal.
66. Valve cap.
67. Secondary pressure port.
68. Hydraulic fluid return.
69. Port to intervane chamber.
70. Section of valve base.
71. Spring.
72. Check ball.
73. Ball seat.
74. Primary pressure port.
75. Secondary pressure port.
76. Modified base plate.
77. Splined section.
78. Central piston.
79. Nut.
80. Threaded section.
81. Male splined section.
82. Female splined section.
83. Intermediate piston.
84. Seal.
85. Piston cap.
86. Seal.
87. Male splined section.
88. Female splined section.
89. Casing.
90. Seal.
91. Casing cap
92. Seal.
93. Piston base.
94. Piston valve.
95. Hydraulic fluid input port.
96. Hydraulic fluid return port.
97. Bolt holes.
98. Valve cap.
99. Seal.
100. Solenoid windings.
101. Magnetostrictive rod.
102. Primary pressure port.
103. Primary pressure port.
104. Hydraulic fluid return.
105. Retraction pressure port.
106. Extension pressure port.
107. Extension pressure area.
108. Retraction pressure channel.
109. Retraction pressure channel.
110. Retraction pressure area.
111. Retraction pressure area.
112. Rotary encoder.
113. Linear encoder.
114. Linear encoder.
115. Horizontal restraining pivot.
116. Ball joint.
117. Ball joint.
118. Linear encoder.
119. Spring attachment.
120. Spring.

FIG. 1 is a general view of an exemplary embodiment of the essential elements of the instant invention showing two spherical wrist joints and one telescoping member and the relationship of elements relative to one another. In FIG. 1, 10 is an upper spherical joint moveable platform, 11 is an upper spherical joint rotary encoder attached to upper spherical joint moveable platform, 10, such that rotation is encoded relative to the ends of upper spherical joint x axis encoder, 12, and upper spherical joint y axis encoder, 13. Linear encoders, 12, and 13, are constrained by mounting pivots to movement generally parallel to a "vertical" plane passing through the center of the upper spherical joint base assembly, 14, but have ball joint type connections to rotary encoder, 11. In combination, linear encoders, 12, and 13, and rotary encoder, 11, define a three-axis position of moveable platform, 10, relative to the base assembly, 14, of the upper spherical joint.

The upper spherical joint of FIG. 1 is connected by suitable means to a modified base plate, 15, which forms the top of a telescoping assembly, 17. In addition, the upper spherical joint of FIG. 1 has an umbilical connection, 16, containing control wiring and hydraulic lines. Telescoping assembly, 17, is connected to lower spherical joint moveable platform, 18, and contains within its structure a means of encoding extension length which will be described below. The lower spherical joint of FIG. 1 is generally comprised of a lower spherical joint moveable platform, 18, a rotary encoder, 19, an x axis linear encoder, 20, a y axis linear encoder, 21, and base assembly, 22.

The upper and lower spherical joints of FIG. 1 are essentially identical in function and construction but may have different dimensions to accommodate different mechanical advantages encountered in use. Taken together the two spherical joints and telescoping assembly of FIG. 1 make a singularity tree robot arm assembly with seven degrees of motion freedom. As shown below, all elements applying force are hydraulically actuated and can deliver very high forces with a minimum of heavy structure. Additional spherical joints and telescoping assemblies could be added to form a robotic arm with many more degrees of freedom. An arm with a plurality of telescoping sections and spherical joints could be useful for specialized applications, including as a robot arm for the space shuttle or as a remote manipulator for a submersible craft.

Figure 2:
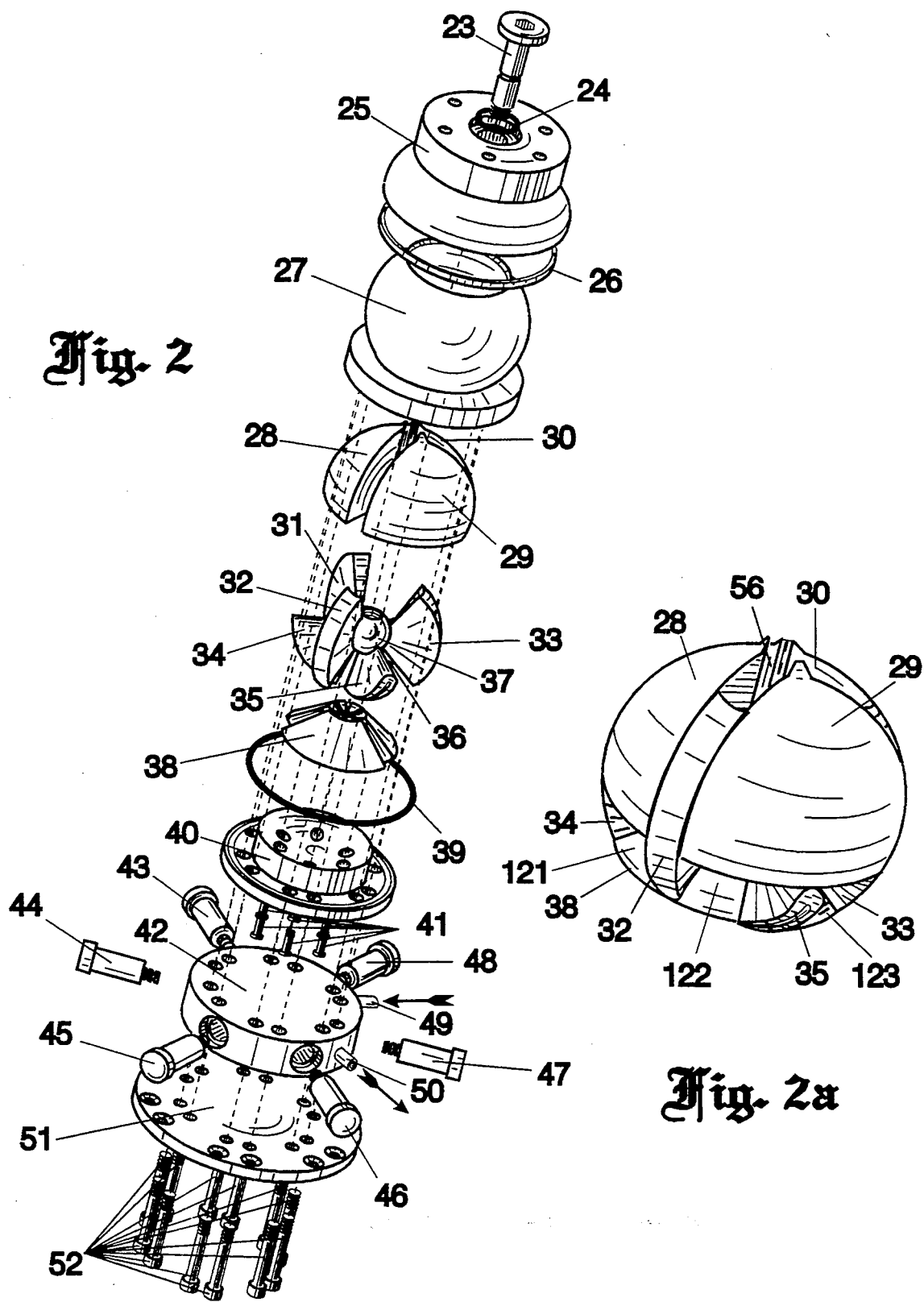
FIG. 2 is an exploded view of an exemplary embodiment of the essential elements of a spherical joint of the instant invention showing the relationship of elements relative to one another.
Figure 3:
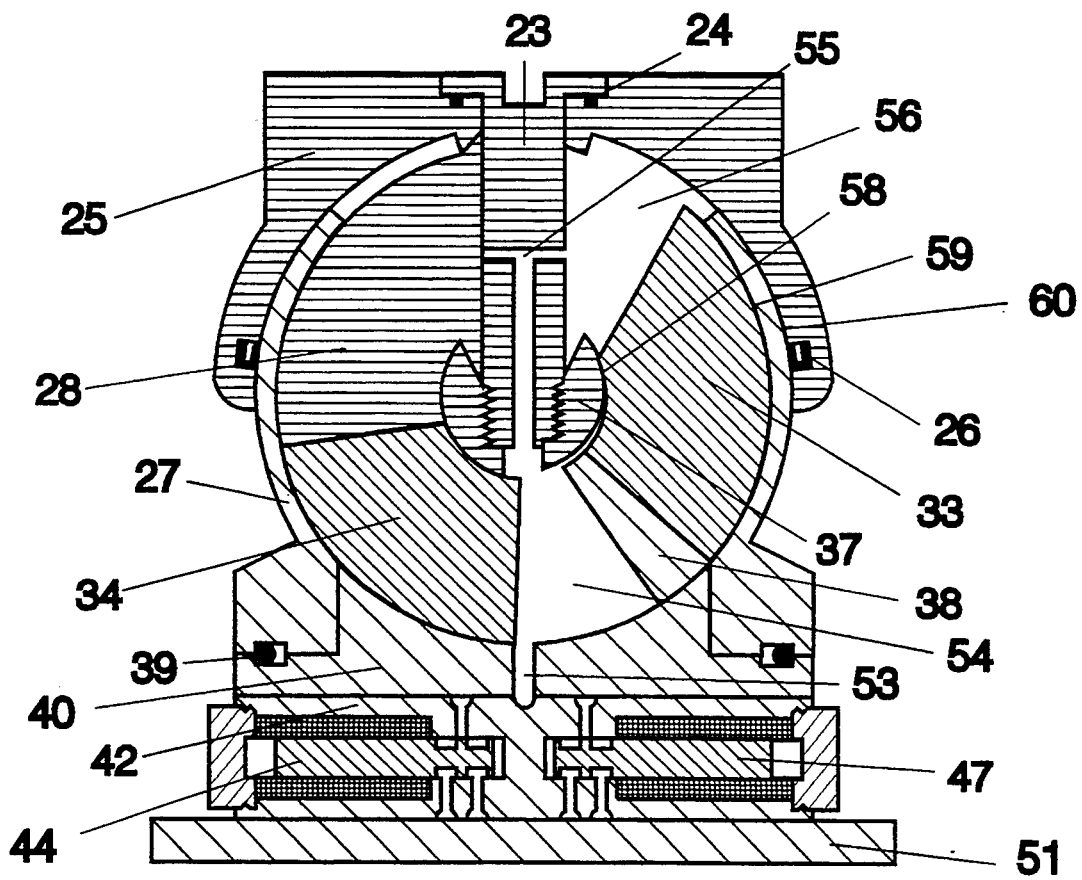
FIG. 3 is a cross-sectional view of an exemplary embodiment of the essential elements of a spherical joint of the instant invention showing the relationship of elements relative to one another.

FIG. 2 is an exploded, and FIG. 3 is a cross-sectional view of an exemplary embodiment of a spherical joint of the instant invention. A better appreciation of the spherical joints of the instant invention can be acquired if both FIGS. 2 and 3 are used when following the description of their various elements. The use of terms such as "upper" and "lower" in the descriptions herein are for convenience only and refer to relations relative to the figures as they would normally be viewed. The instant invention itself is essentially unaffected by orientation. In FIGS. 2 and 3, 23 is a central bolt, 24 is a seal and 25 is a moveable platform. Bolt, 23, is threaded into central sphere, 37, and effectively locks second arcuate vane guides, 28, 29 and 30, to moveable platform, 25. Moveable platform, 25, has notches or other features machined into it (not shown) that mate with corresponding features on the upper portions of vane guides, 28, 29 and 30, to prevent rotation about the major axis of bolt, 23, relative to moveable platform, 25.

Seal, 26, fits within a suitable grove in movable platform, 25, and rides against the outer spherical surface, 60, of spherical casing, 27. Seal, 26, is the only seal within the spherical joint of the instant invention that must seal against a moving surface with a high pressure differential between the internal and external environment. The moving surface that seal, 26 seals against is essentially spherical. Sealing against a spherical surface is a well developed area of technology. Other "seals" of the instant invention that involve moving surfaces are between areas of high hydraulic fluid pressure and hydraulic fluid return. A small amount of leakage between the high pressure side and fluid return is acceptable, since there is no actual fluid loss, and may be of some benefit as it will aid system damping.

Second arcuate vanes, 31, 32 and 33, fit in tile arcuate slots formed by second arcuate vane guides, 28, 29 and 30, between inner spherical surface, 58, which is the outer surface of central sphere, 37, and median spherical surface, 59, which is the inner surface of spherical casing, 27. Second arcuate vanes, 31, 32 and 33, are free to rotate in a generally 'up and down' direction within the arcuate slots formed by second arcuate vane guides, 28, 29 and 30. Second arcuate vanes, 31, 32 and 33, rotate about a center of rotation which coincides with the spherical centers of spherical surfaces 58, 59 and 60. Second arcuate vanes, 31, 32 and 33, are forced generally downward until they contact the upper surface of the first arcuate vane guide, 38, by primary hydraulic pressure present in channel, 53, pressure area, 54, pressure channel, 55, and pressure area, 56. The primary hydraulic pressure is the "system" hydraulic pressure and is the highest hydraulic pressure used within the spherical joint of the instant invention. A means of developing a secondary, lower pressure hydraulic fluid for other areas of the instant invention is described below.

First arcuate vanes, 34, 35 and 36, ride in arcuate slots in first arcuate vane guide, 38, and between inner spherical surface, 58, which is the outer surface of central sphere, 37, and median spherical surface, 59, which is the inner surface of spherical casing, 27, and the top surface of spherical base, 40. The first arcuate vane guide, 38, is bolted firmly to spherical base, 40, by bolts, 41, or other suitable means. First arcuate vanes, 34, 35 and 36, are free to rotate in a generally 'up and down' direction within the arcuate slots formed by first arcuate vane guide, 38. First arcuate vanes, 34, 35 and 36, rotate about a center of rotation which coincides with the spherical centers of spherical surfaces 58, 59 and 60. First arcuate vanes, 34, 35 and 36, are forced generally upward until they contact the lower surfaces of the second arcuate vane guides, 31, 32, and 33, by primary hydraulic pressure present in channel, 53, and pressure area, 54.

In the preferred embodiment of the instant invention six chambers are formed by the interdigitized first and second arcuate vanes, their associated vane guides, and spherical surfaces 58, and 59. Each of these chambers has a particular volume that is s determined by the relative tilt and rotation of the moveable platform, 25, and attached elements. Conversely, the relative tilt and rotation of moveable platform, 25, can be controlled by controlling the volume of fluid within the interdigitized chambers. This relationship suggests that the spherical joint of the instant invention could be used as a remote manipulator by connecting the respective chambers of two units together and applying forces to one which would be followed by the other in inverse direction. When used as a controlled spherical joint, however, a means of controlling the volume of the chambers formed by the interdigitized first and second arcuate vanes, their associated vane guides and spherical surfaces 58, and 59, is obtained with the use of hydraulic valves 43 through 48. Each valve has an associated intervane chamber that it serves by means of channels in valve base, 42, spherical base, 40, and lower valve guide, 38. Channels are not shown in the drawings, to assure clarity. Valves 43 through 48 are double acting; that is, they can open to hydraulic secondary pressure or to fluid return paths as required. The valves used in the preferred embodiment of the instant invention are based on magnetostrictive elastic-wave motors and have the advantages of very precise and fast operation with little or no hysteresis. Elastic wave motor technology and its uses are not well known in the field as yet, so an elaboration of the valves used in the instant invention is presented below to facilitate the reader's understanding. Valves 43 through 48 are mounted in valve base, 42. Hydraulic fluid input port, 49, and hydraulic fluid return port, 50, supply hydraulic fluid under pressure and a return path for hydraulic fluid. Bolts, 52, pass through base plate, 51, valve base, 42, spherical base, 40, and are threaded into the bottom of spherical casing, 27. Seal, 39, prevents leakage between spherical casing, 27, and spherical base, 40. Thin gaskets should also be incorporated between spherical base, 40, and valve base, 42, as well as between valve base, 42, and base plate, 51, but are not shown on the drawings for clarity.

Figure 4:
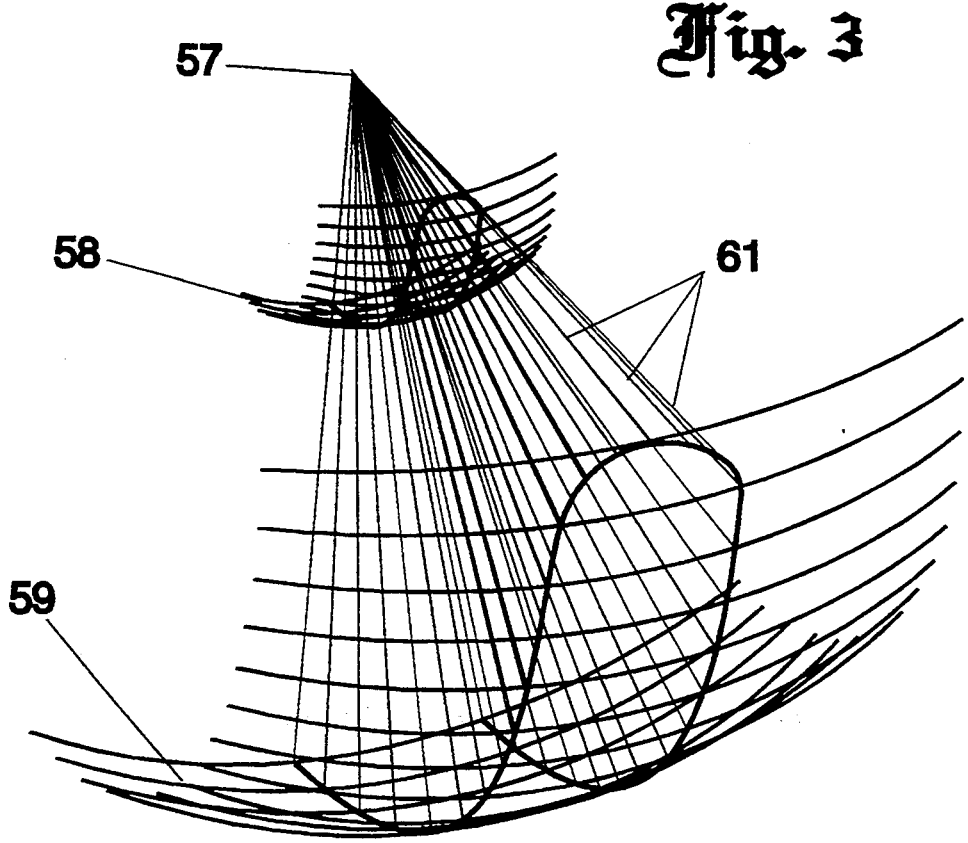
FIG. 4 is a wire-frame view of a generalized first arcuate vane of the present invention showing the relationship of various surface features to the center of rotation of the present invention.

FIG. 4 is presented to illustrate the general principle that essentially all of the sliding surfaces of the spherical joint of the instant invention are formed on either spherical surfaces with a common center or radii to that same center. FIG. 4 generally illustrates a first arcuate vane of the spherical joint of the instant invention, with 57 indicating the spherical center, 58 indicating the inner spherical surface (the outer surface of central sphere, 37, and the inner spherical surface of both first and second arcuate vanes), 59 indicating the median spherical surface (the outer surface of both first and second arcuate vanes and the inner surface of spherical casing, 27), and 61 indicating radii. The upper surface of the first arcuate vane guide, 38, and the lower surfaces of the second arcuate vane guides, 28, 29 and 30 are also on radii. Even though the orientation of a particular vane to an opposite vane guide will not be perpendicular in all positions of tilt, a good seal is guaranteed because the mating surfaces will be on common radii.

Figure 5:
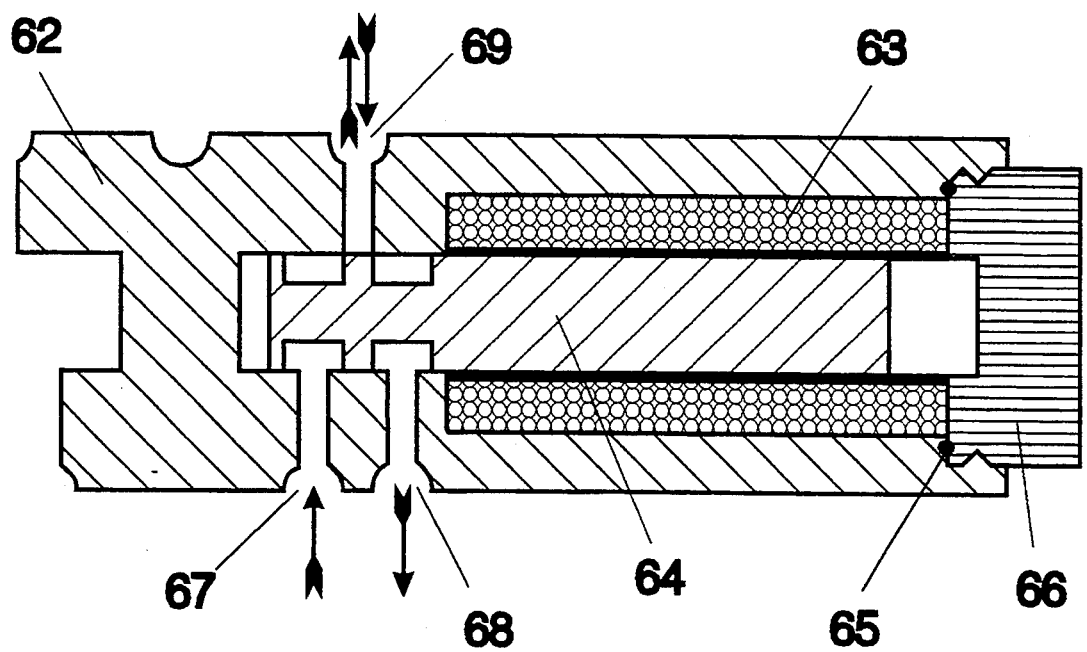
FIG. 5 is a cross-sectional view of a high speed hydraulic valve based on elastic wave motor technology and employed in an exemplary embodiment of the instant invention.

FIG. 5 is a cross-sectional view of a high speed hydraulic valve based on elastic wave motor technology and employed in an exemplary embodiment of the instant invention. Elastic wave motors are currently being manufactured by DynaMotive Corporation of Richmond, B.C., Canada. In FIG. 5, 62 is a section of valve base, 42, and 63 is a series of solenoid windings surrounding magnetostrictive rod, 64. The valve apparatus is sealed into the valve base with seal, 65, and valve cap, 66. A secondary hydraulic pressure port is indicated by 67, and a hydraulic fluid return by 68. A port to an intervane chamber is indicated by 69. The solenoid windings, 63, comprise a series of individually addressable windings surrounding a significant portion of magnetostrictive rod, 64. The valve is operated by moving the magnetostrictive rod, 64, either left or right (relative to the drawing), thus opening either port 67 or 68 to port 69. Movement of rod 64 is accomplished by subjecting it to a "rippling" series of magnetizations along its length. Current in the solenoid winding causes a localized magnetic field that passes through an adjacent portion of magnetostrictive rod, 64, causing it to contract radially and elongate within its chamber. Magnetostrictive rod, 64, is normally held tightly within its chamber by being machined to a dimension slightly larger than the chamber holding it. When an end coil of solenoid, 63, is energized an adjacent portion of magnetostrictive rod, 64, is caused to extend. When the next coil in line is energized the area of extension moves along the rod. As adjacent coils are energized the area of extension moves along the length of rod until the entire rod has been displaced. A continuous series of "rippled" energizations can move the rod rapidly either left or right depending on which end of the solenoid windings the "rippling" starts. Furthermore, fine control can be obtained by varying the current in the coil winding closest to the left on the drawing, thus causing the actual valving portion of the magnetostrictive rod, 64, to move a small amount as the rod is elongated by the magnetic field. For a much more complete description of elastic wave motors the interested reader should see the fine article by Reinhold C. Roth of DynaMotive Corporation entitled "Elastic Wave Motor Produces Linear Motion With Precise, High Force" published in Power Conversion and Intelligent Motion in August of 1992.

Figure 6:
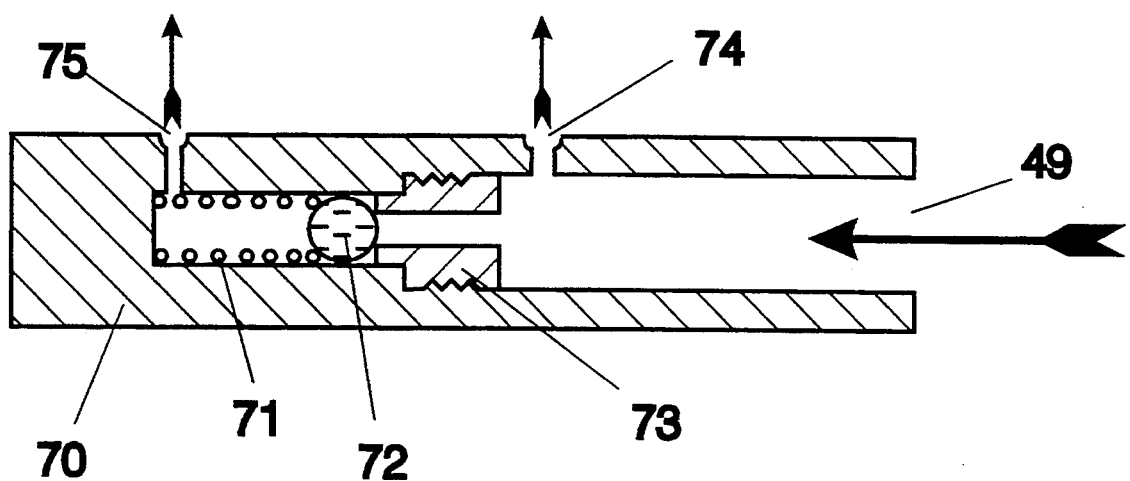
FIG. 6 is a cross sectional view of a means of reducing hydraulic pressure for the instant invention so that a higher and a lower hydraulic pressure is available for use within the spherical joint of an exemplary embodiment of the instant invention.

FIG. 6 is a cross sectional view of a means of reducing hydraulic pressure for the instant invention so that a higher and a lower hydraulic pressure is available for use within the spherical joint of an exemplary embodiment of the instant invention. The arcuate vanes of the spherical joint of the instant invention are pressed against their opposing vane guide surfaces by hydraulic pressure that must always be some increment higher than any pressure acting on the other end of the vanes. This pressure differential guarantees that the vanes are always rotatably extended from their guides as much as is possible. In FIG. 6, 70 is a section of valve base, 42. Spring, 71, presses check ball, 72, against ball seat, 73. Primary hydraulic pressure enters at 49 and exits at the same pressure out port 74 where it is channeled to channel 53 (see FIG. 3) by channels (not shown). Primary hydraulic pressure acting through a hole in ball seat, 73, forces check ball, 72, to move away from ball seat, 73, if the back pressure is low enough, thus allowing hydraulic fluid to flow around check ball, 72, and spring, 71, and out port 75 to be channeled to the secondary pressure inputs of valves 43 through 48 (see FIG. 2). The pressure differential developed between ports 74 and 75 is a direct function of spring strength and the area of the hole in ball seat, 73.

Figure 7:
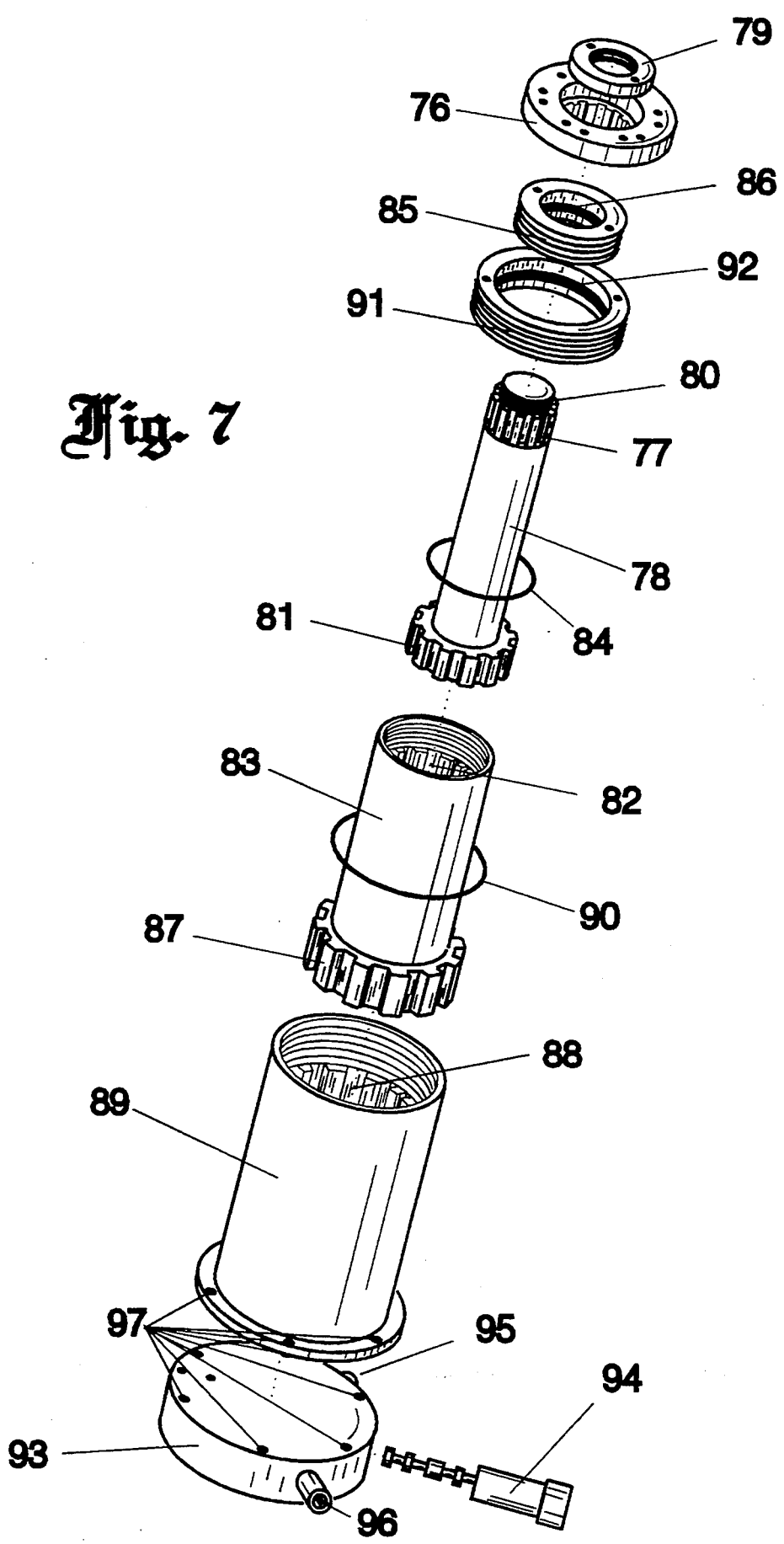
FIG. 7 is an exploded view of an exemplary embodiment of the essential elements of a telescoping section of the instant invention showing the relationship of elements relative to one another.
Figure 8:
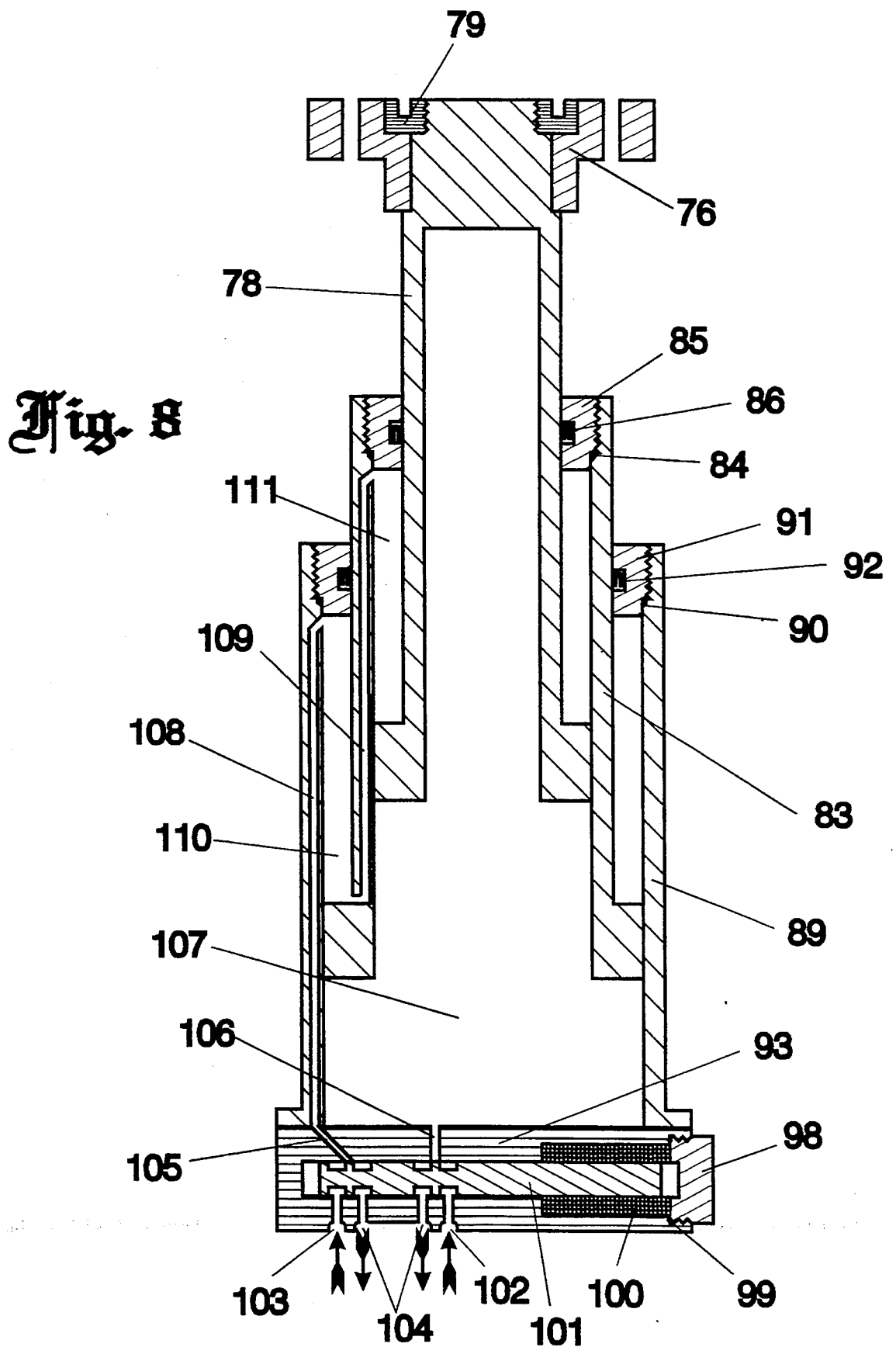
FIG. 8 is a cross-sectional view of an exemplary embodiment of the essential elements of a telescoping section of the instant invention showing the relationship of elements relative to one another.

FIG. 7 is an exploded, and FIG. 8 is a cross-sectional view of an exemplary embodiment of a telescoping section of the instant invention. A better appreciation of the telescoping section of the instant invention can be acquired if both FIGS. 7 and 8 are used when following the description of their various elements. Modified base plate, 76 has a splined fit with splines, 77, on the upper portion of central piston, 78, and is held in place with nut, 79, threaded onto a threaded portion of the central piston, 80. Central piston, 78, has a second, raised, male splined section, 81, that fits within the female splined section, 82, of intermediate piston, 83. Central piston, 78, is sealed against leakage to the outside environment with seal, 84, piston cap, 85, and seal, 86. Piston cap, 85, screws into the top of intermediate piston, 83. Intermediate piston, 83, has a raised male splined section, 87, that fits within the female splined section, 88, of casing, 89. Intermediate piston, 83, is sealed against leakage to the outside environment with seal, 90, casing cap, 91, and seal, 92. Casing cap, 9 1, screws into the top of casing, 89. Piston base, 93, contains piston valve, 94, hydraulic fluid input port, 95, and hydraulic fluid return port, 96. Casing, 89, is attached to piston base, 93, with suitable bolts that pass through holes, 97, in both the casing, 89, and piston base, 93, into the moveable platform of a spherical joint a of the instant invention. Thin gaskets (not shown) should be used between casing, 89, and piston base, 93, and between piston base, 93, and the moveable platform of a spherical joint of the instant invention to prevent fluid leaks.

Piston valve, 94, is sealed into piston base, 93, with valve cap, 98, and seal, 99. Piston valve, 94, operates in essentially the same fashion as valves 43 through 48 except that two double-acting valves are actuated on the same magnetostrictive rod. Solenoid windings, 100, cause magnetostrictive rod, 101, to move left and right as described above. When magnetostrictive rod, 101, moves right: primary hydraulic pressure at pressure port 103 forces fluid into retraction pressure port 105, to retraction pressure channel 108, and to retraction pressure area 110, and to retraction pressure channel 109, and to retraction pressure area 111. At the same time a rightward movement of magnetostrictive rod, 101, is opening hydraulic pressure to the retraction surfaces of the telescoping section of the instant invention, pressure in the extension area of the telescoping section at 107 is allowed to bleed through port 106 to hydraulic fluid returns at ports 104. A leftward movement of magnetostrictive rod, 101, opens port 106 to primary hydraulic pressure from port 102 and simultaneously allows pressure from areas 110 and 111 to bleed through channels 108 and 109 to 105 to hydraulic fluid returns at 104. The telescoping section of the instant invention is double-acting in that it can be made to extend or retract under positive pressure, but it is limited to only one degree of motion by the splined surfaces. Limiting "rotary" motion is necessary for the telescopic section of the instant invention to transmit torque from the spherical joints of the instant invention. The splines at 81 and 82, and also at 87 and 88 will leak slightly from areas of high pressure to areas of low pressure, but this is acceptable because no fluid escapes the system via this pathway and damping is actually improved.

FIG. 9 is a view of an exemplary system for position measurement of a spherical joint of the instant invention showing a rotary encoder, 112 and two linear encoders, 113 and 114. The rotary encoder, 112 could be attached to the moveable platform of a spherical joint of the instant invention, and the linear encoders, 112 and 113 attached via ball joints, 116 and 117 to the rotary encoder in such a way that tilt in the x or y planes causes inputs to the linear encoders but no input to the rotary encoder, and rotation of the rotary encoder causes no input to the linear encoders. These constraints are accomplished by insuring that the linear encoders may only move in orthogonal vertical planes generally passing through the center of the spherical joint. This means that horizontally restraining pivot, 115, must be very stiff in directions perpendicular to the above referenced orthogonal vertical planes, as must a corresponding pivot on linear encoder 113. The moveable shafts of linear encoders, 112 and 113 must also fit precisely and be free of lateral wobble. In the preferred embodiment of the instant invention Linear Voltage Differential Transformer (LVDT) linear and Rotational Voltage Differential Transformer (RVDT) rotational encoders are preferred because of their high precision and ease of interface to control equipment.

FIG. 10 is a view of a possible system for position measurement of a telescoping section of the instant invention showing a spring used as a proportioning element for a linear encoder with limited stroke. The telescoping section of the instant invention can be elaborated to have as many intermediate sections as are needed for a particular application. This poses a position measuring problem as the telescoping section extends to several times its retracted length and any position measuring system must be able to accommodate to this range, preferably without becoming cumbersome. In the preferred embodiment of the instant invention, the spring-proportioned schema of FIG. 10 is mounted in the center of extension pressure area, 107, (see FIG. 8). Use of an electrical encoding device immersed in hydraulic fluid restricts the type of hydraulic fluid used in the system to non-polar types (oil based). In FIG. 10, 118 is a linear encoder, preferably of the LVDT type, 119 is an attachment device to attach the measuring rod of the encoder to spring, 120. The measuring rod of linear encoder, 118, should be very free to move within the encoder base to reduce measurement hysteresis. The fluid surrounding spring, 120, provides excellent damping for this system. As the end of spring, 120, is extended the measuring rod of linear encoder, 118, will also be extended proportionally, with the proportionality ratio being the same as the ratio of connection point of linear encoder, 118, to total length of spring, 120.

Obviously, many modifications and variations of the present invention are possible in light of the above teachings. It is therefore to be understood that the specific embodiment described is by way of illustration only and that the invention is not necessarily limited thereto, since alternative embodiments and operating techniques will become apparent to those skilled in the art in view of the disclosure. Accordingly, within the scope of the appended claims, the invention may be practiced otherwise than as specifically described without departing from the spirit of the described invention.

Having described the invention, what is claimed as new and desired to be secured by Letters Patent is:

1. A fluid pressure operated spherical joint comprising:
    a movable platform;
    a central sphere;
    an attachment means rigidly attached to the movable platform and the central sphere, whereby the movable platform, the central sphere, and the attachment means form a tiltable member of the joint;
    a hollow spherical casing rigidly attached to a spherical base;
    a plurality of first arcuate vane guides spaced from each other and rigidly attached to the tiltable member;
    a plurality of second arcuate vane guides spaced from each other, arranged about the central sphere, and attached to the spherical casing or base;
    a plurality of first arcuate vanes movable within slots formed between the first arcuate vane guides;
    a plurality of second arcuate vanes movable within slots formed between the second arcuate vane guides;
    whereby a fluid pressure introduced to the spherical joint produces a first pressure which forces the first and second arcuate vanes to abut against the second and first arcuate vane guides, respectively, forming a seal therebetween and produces a second pressure, lower than the first pressure, within selected pressure chambers formed between the first and second arcuate vanes, the second pressure resulting in a pivoting and/or tilting movement of the tiltable member.

2. The fluid pressure operated spherical joint of claim 1, and further comprising a control valve having restriction means therein, and a source of fluid pressure supplied to the control valve, whereby the first higher pressure is substantially the same pressure as the fluid pressure supplied to the control valve, and the second lower pressure is the pressure which passes through the restriction means.

3. The fluid pressure operated spherical joint of claim 2, whereby the fluid pressure is hydraulic fluid under pressure.

4. A fluid operated motor assembly in which an introduction of fluid under pressure results in a first pressure and a second, lower pressure being applied to the motor assembly and producing a pivoting and/or tilting motion, comprising:
- a first vane guide having an upper surface and a first vane guide arcuate slot; and
- a second vane guide spaced from said first vane guide, said second vane guide having a lower surface and a second vane guide arcuate slot; and
- a first arcuate vane having an upper sealing surface, a lower pressure surface, and a side surface; and
- a second arcuate vane having a lower sealing surface, an upper pressure surface, and a side surface; and
- whereby a pressure chamber for the motor is formed by the inside surfaces of the first and second arcuate vanes, the upper sealing surface of the first vane guide, and the lower sealing surface of the second vane guide; and
- such that the first higher pressure acts on the pressure surfaces of the respective arcuate vanes, producing a force which forces the upper sealing surface of the first arcuate vane to abut against the upper surface of the second vane guide and forces the lower sealing surface of the second arcuate vane to abut against the lower surface of the first vane guide to produce a fluid seal therebetween; and
- such that the second lower pressure applied within the pressure chamber produces a pivoting and/or tilting motion of the second vane guide with respect to the first vane guide.

5. The fluid operated motor assembly of claim 4, and further comprising a plurality of control valves for each pressure chamber of the fluid operated motor assembly, each of the control valves having an upstream side and a downstream side with a restrictor means disposed therebetween, each control valve being connected at its upstream side to a source of fluid pressure, whereby each pressure chamber of the motor assembly is in communication with the downstream side of each respective control valve, whereby the first higher pressure is substantially the same pressure as the fluid pressure supplied to the control valve at its upstream side, and the second lower pressure is the pressure which passes through the restriction means.

6. The fluid pressure operated spherical joint of claim 5, whereby the fluid pressure is hydraulic fluid under pressure.

7. A fluid pressure operated robot arm assembly, comprising:
- a plurality of fluid operated motor assemblies of claim 4 and a plurality of telescoping cylinder assemblies, whereby each telescoping cylinder assembly comprises:
- a lower base member;
- control valve means communicating with the base member;
- a casing attached to the lower base member;
- a piston movably disposed within the casing;
- an upper base plate rigidly attached to an end of the piston;
- whereby the piston extends within the casing under an influence of a fluid pressure applied to a side of the piston through the control valve means;
- and further, whereby each of the lower base members and upper base plates of the telescoping cylinder assemblies is connected to one of the fluid operated motor assemblies, respectively, such that the fluid pressure operated robot arm assembly can extend and/or pivot.

8. The fluid operated motor assembly of claim 4, and further comprising a plurality of control valves for each pressure chamber of the fluid operated motor assembly, each of the control valves having an upstream side and a downstream side with a restrictor means disposed therebetween, each control valve being connected at its upstream side to a source of fluid pressure, whereby each pressure chamber of the motor assembly is in communication with the downstream side of each respective control valve, whereby the first higher pressure is substantially the same pressure as the fluid pressure supplied to the control valve at its upstream side, and the second lower pressure is the pressure which passes through the restriction means.

9. The fluid pressure operated spherical joint of claim 5, whereby the fluid pressure is hydraulic fluid under pressure.

* * * * *

UNITED STATES PATENT AND TRADEMARK OFFICE
CERTIFICATE OF CORRECTION

| | |
|---|---|
| PATENT NO. : | 5,410,944 |
| DATED : | May 2, 1995 |
| INVENTOR(S) : | William B. Cushman |

It is certified that error appears in the above-indentified patent and that said Letters Patent is hereby corrected as shown below:

Please insert the following between lines 53 and 54 of column 2:

"Fig. 2a is a view of some of the essential elements of an exemplary embodiment of the spherical joint of the instant invention showing one relative position of the arcuate vanes and vane guides as they would appear when assembled."

Please insert the following at the end of the table of column 4:

121. Secondary pressure area.
122. Secondary pressure area.
123. Secondary pressure area.

UNITED STATES PATENT AND TRADEMARK OFFICE
CERTIFICATE OF CORRECTION

Page 2 of 2

PATENT NO. : 5,410,944
DATED : May 2, 1995
INVENTOR(S) : William B. Cushman

It is certified that error appears in the above-indentified patent and that said Letters Patent is hereby corrected as shown below:

Please insert the following between lines 37 and 38 of column 6:

"Fig. 2a shows one relative position of some of the essential elements of the spherical joint of fig. 2. as they would appear when reassembled. In fig. 2a, arcuate vane guides 28, 29, and 30 form slots within which arcuate vanes 31, 32 and 33 rotate generally 'up and down'. Arcuate vane 31 is not visible in fig. 2a. Arcuate vanes 31, 32 and 33 are pressed downward against the upper surface of vane guide 38 by fluid pressure in area 56. In a similar fashion arcuate vanes 34, 35 and 36 are pressed upward against the lower surfaces of vane guides 28, 29, and 30 by fluid pressure at their lower ends. The interdigitizing of the respective first and second vanes forms chambers (121, 122, and 123 are examples) into which fluid pressure can be introduced to cause rotation or tilting of one set of vane guides relative to the other."

Signed and Sealed this

Twenty-first Day of November, 1995

Attest:

BRUCE LEHMAN

*Attesting Officer*  *Commissioner of Patents and Trademarks*